United States Patent [19]

Yamaguchi et al.

[11] Patent Number: 4,616,108

[45] Date of Patent: Oct. 7, 1986

[54] DOMESTIC SATELLITE COMMUNICATION SYSTEM

[75] Inventors: Mamoru Yamaguchi; Masanori Oshima, both of Tokyo, Japan

[73] Assignee: NEC Corporation, Tokyo, Japan

[21] Appl. No.: 636,844

[22] Filed: Aug. 1, 1984

[30] Foreign Application Priority Data

Aug. 4, 1983 [JP] Japan ................. 58-142937

[51] Int. Cl.⁴ .......................... H01M 11/00
[52] U.S. Cl. ................. 179/2 E; 179/2 EB
[58] Field of Search ............ 179/2 E, 2 EB; 455/9–13, 17, 15, 16, 52, 53, 54, 56, 67

[56] References Cited

U.S. PATENT DOCUMENTS 3,942,115  3/1976  Wolejsza, Jr. ............. 455/12 X
4,273,962  6/1981  Wolfe ..................... 455/12 X
4,424,417  1/1984  Chavey et al. ............ 455/12 X

OTHER PUBLICATIONS

Telecom 1, A National Satellite for Domestic and Business Services, CH1435-7/79 0000-027 IEEE.

Primary Examiner—Robert G. Lev
Attorney, Agent, or Firm—Laff, Whitesel, Conte & Saret

[57] ABSTRACT

A direct broadcast communication satellite system prevents over-charge for earth-subscriber to earth-subscriber toll calls via radio links to an earth station regardless of faults which may occur in satellite channels. A central earth station controls the frequency assignment of the radio link channels used for voice communication. Each of a plurality of subscriber earth stations has at least one voice communication terminal, with means for identifying a call destined for a subscriber at that earth station. The continuity of the channels involved in that call are monitored by periodically transmitting and receiving out-of-band signals on the assigned channel. It appears that there has been a loss of signal when the out-of-band signal does not appear, twice in succession. Then, the channel is released and the toll charges are terminated.

11 Claims, 5 Drawing Figures

DOMESTIC SATELLITE COMMUNICATION SYSTEM

BACKGROUND OF THE INVENTION

This invention relates to a domestic satellite communication system (DSC system) and, more particularly, to a DSC system for voice communication between subscribers served by subscriber earth stations via one single satellite link.

Generally, satellite communication systems are suitable for long-distance communication since construction cost and transmission quality are less relevant to the distance compared costs for land communication systems. They are especially effective and less costly when constructed as a domestic communication system in countries having a vast area, geographically dispersed islands, or still undeveloped. In the domestic satellite communication systems between subscribers served by subscriber earth stations is carried out via a satellite on a stationary orbit at an altitude of approximately 36,000 km. It inevitably causes a propagation delay which is incomparably longer than delays in an overland communication system.

The delay time generally extends for about 260 ms per satellite link (i.e., from an earth station to a satellite and return an earth station). Most DSC systems uses a single central earth station which concentratedly controls demand assignments for satellite channels when a demand arises so that satellite channels with a limited number of radio frequencies are flexibly assigned to suit varying traffic volume. When voice communication is conducted between subscribers of subscriber earth stations which are controlled by such a central earth station via a demand-assigned channel of a satellite, it becomes indispensable to pass the communication through the channel connected to a central switching system, as well as to charge for such subscriber-to-subscriber communication through the central switching system. In such a case, however, because two satellite links exist between the subscriber earth stations, channels cannot be used at a high efficiency. Moreover, since voice signals experience the propagation delay of approximately 520 ms in two such links, voice communication becomes difficult.

U.S. Pat. No. 4,273,962, discloses an example of a DSC system which can achieve an efficient use of satellite channels and minimize a propagation delay of voice signals. However, this system cannot prevent an overcharge for communication between the calling subscriber and the called subscriber, via one satellite link, if a fault occurs in a satellite channel during the continuity of a call because a charge (an impulse metering)) in the calling subscriber earth station continues until either the calling subscriber hangs up or the calling subscriber earth station hangs upon command from the central earth station (the master station).

SUMMARY OF THE INVENTION

An object of this invention is, therefore, to provde a DSC system which gives voice communication between subscriber served by subscriber earth stations via a single satellite link with a minimized propagation delay of voice signals. Another object is to provide an efficient use of satellite channels.

Another object of this invention is to provide a DSC system which can prevent an over-charge for subscriber-to-subscriber communication via one satellite link irrespective of faults which might occur in satellite channels.

According to one aspect of the invention, a DSC system includes a demand assignment central earth station which controls the frequency assignment of satellite channels for voice communication in response to an occurrence of calls. The central station discriminates between subscriber earth station-to-subscriber earth station calls and is connected to a central switching system for carrying out a voice switching operation. Each of a plurality of subscriber earth stations has at least one voice communication terminal. Each of the subscriber earth station comprises means for indicating that a call detected at the central earth station is the one for a subscriber earth station-to-subscriber earth station call and a communication continuity state at the voice communication terminals. Periodically, an out-of-band signal is transmitted to a voice communication satellite channel which is assigned by the central earth station while the monitoring means detects the communication continuity state and the indication means indicates the subscriber earth station-to-subscriber earth station call. The central earth station comprises means for demodulating the out-of-band signal transmitted from the subscriber earth station. The out-of-band signal which has been received is demodulated by the demodulating means. The state of the communication continuity is monitored between the subscriber earth stations, by periodically reading out the output of the receiving means. A tuned frequency from the demodulating means is made to coincide with a frequency assigned to the voice communication between the subscriber earth stations, whereby the subscriber earth station-to-subscriber earth station call is completed via one satellite link.

BRIEF DESCRIPTION OF THE DRAWINGS

The above and other objects and features of the invention may be fully understood from the following detailed description and the accompanying drawings in which.

In the drawings, identical numerals denote identical structural elements.

DESCRIPTION OF THE PREFERRED EMBODIMENTS

Figure 1:
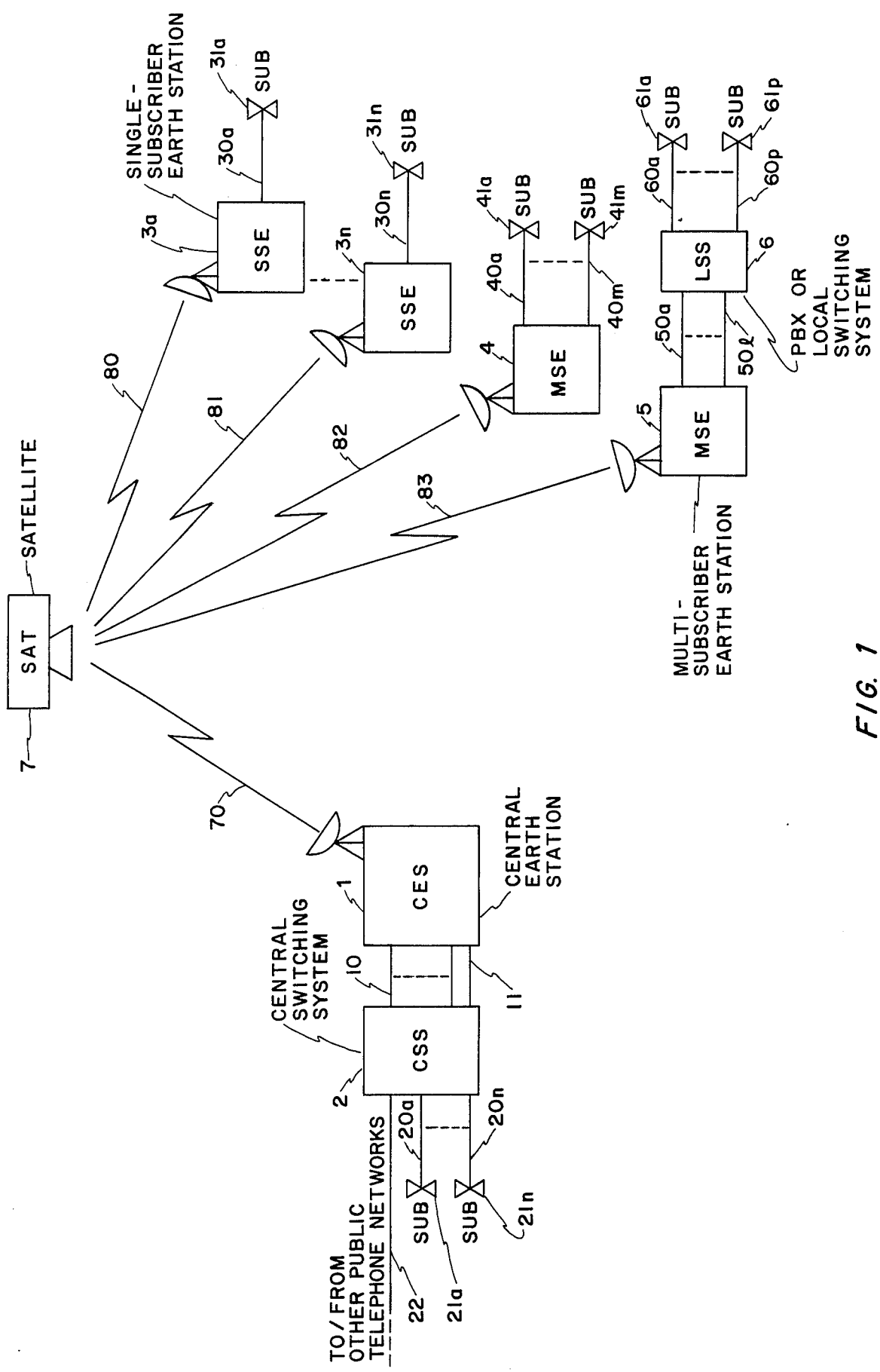
FIG. 1 shows an embodiment of this invention including a central earth station, a satellite, and a plurality of outlying ground stations.

Referring to FIG. 1, an embodiment of the invention comprises one central earth station ("CES") 1. A central switching system ("CSS") 2 connects the station 1 via transmission lines 10 and 11 to a plurality of subscriber stations 21a through 21n via transmission lines 20a through 20n. A line 22 is connected to other public telephone networks. Each single-subscriber earth stations ("SSE") 3a through 3n serves one subscriber station each 31a through 31n via transmission lines 30a through 30n. A multi-subscriber earth station ("MSE")

4 serves a plurality of subscriber stations 41a through 41n via transmission lines 40a through 40m. An MSE station 5 serves a plurality of subscriber stations 61a through 61p via transmission lines 50a through 50l and 60a through 60p, and a local switching system 6. A satellite 7 interconnects the central earth station CES 1, single subscriber stations SSE 3a through 3n, and multi-subscriber stations MSE 4 and 5 via satellite links 70, 80, 81, 82 and 83.

More specifically, the CES station 1 is installed within the same building as the central switching system CSS 2 having a telephone exchange function; or,it may be installed in a building adjacent thereto in a capital or a central city of a nation. On the other hand, the SSE stations 3a through 3n and the MSE stations 4 and 5 are installed at locations which are geographically remote from the station 1 and are apart from each other. The SSE stations 3a through 3n are basically installed at households and at public telephone booths, respectively. The MSE station 4 is installed at the center of an area where a plurality of subscribers are located within relatively short distance. However, as described hereinafter, a portion of the MSE station 4 may be installed at the center of such an area.

The MSE station 5 is generally installed at companies having a private branch exchange LSS 6. It is not necessarily set up at such a company. It may also be at the center of an area similar to the area served by station 4. The MSE station 5 which converges a plurality of subscriber stations 61a through 61p into lines 50a through 50l via the exchange LSS 6 can be constructed at a lower cost than the MSE station 4 and has a great flexibility for handling a variable number of calls.

Figure 2:
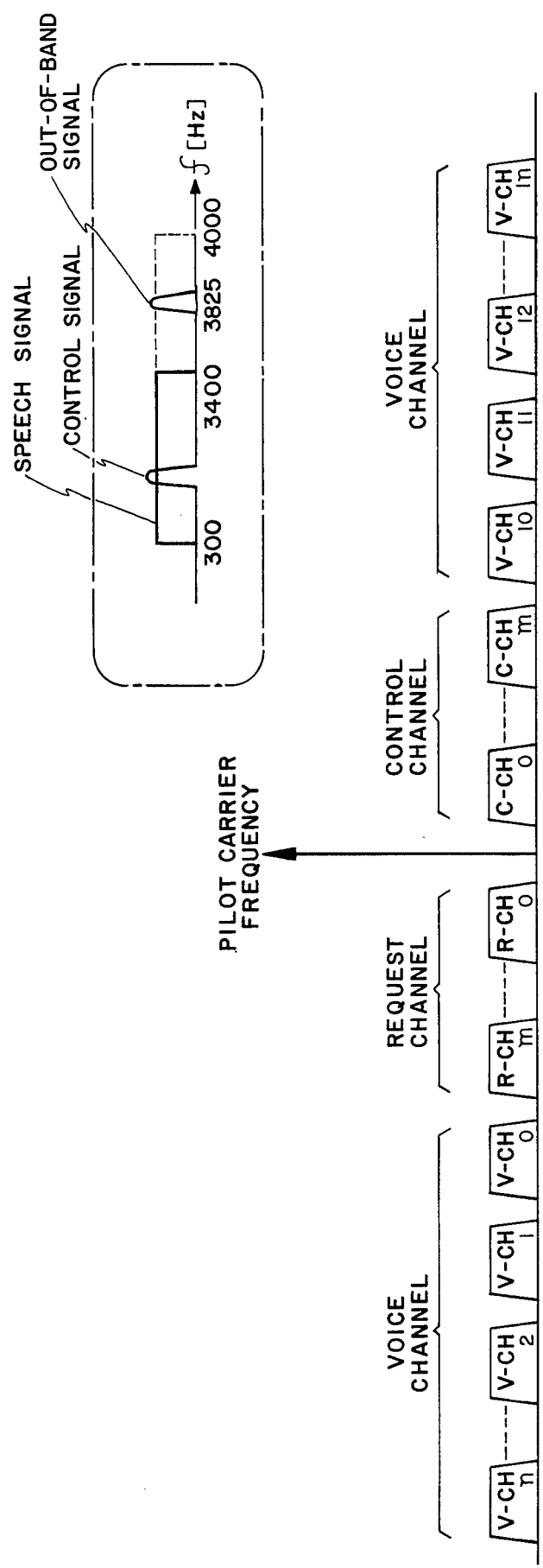
FIG. 2 shows frequency allocation of the satellite shown in FIG. 1.

The satellite 7 is launched into a stationary or synchronous orbit at an altitude of approximately 36,000 km to relay signals according to the frequency allocation shown in FIG. 2. All of the subscriber stations 31a through 31n, 41a through 41m and 61a through 61p can communicate with each other in voice via the satellite 7 and under the control of the central earth station CES 1. These subscribers can also communicate with other subscribers of other networks connected by the line 22 and with subscriber stations 21a through 21n which are served by the central switching system CSS 2.

Referring now to FIGS. 1 and 2, various control signals are given from the central earth station CES 1 (FIG. 1) to the SSE stations 3a through 3n and the MSE stations 4 and 5. These signals are transmitted via control channels C-CH$_O$ through C-CH$_m$ (FIG. 2) as TDM (time division multiplex) signals. Various control signals are supplied from the SSE stations 3a through 3n and the MSE stations 4 and 5 to the CES station 1, via request channels R-CH$_O$ through R-CH$_m$ as TDMA (time division multiple access) signals.

The speech signals transmitted between the CES station 1, the SSE stations 3a through 3n, and the MSE stations 4 and 5 are transmitted and received via voice channels V-CH$_O$ through V-CH$_n$ and V-CH$_{10}$ through V-CH$_{1n}$. Different radio frequencies are assigned to those voice channels V-CH$_O$ through V-CH$_n$ and V-CH$_{10}$ through V-CH$_{1n}$ and are concentratedly controlled by the CES stations 1. Frequencies are demand-assigned corresponding to the occurrence of a call or a demand from the SSE stations 3a through 3n and the MSE stations 4 and 5. Similarly, different radio frequencies are assigned to the control channels C-CH$_O$ through C-CH$_m$ and the request channels R-CH$_O$ through R-Ch$_m$.

The time slots of the request channels R-CH$_O$ through R-CH$_m$ are random-accessed by each subscriber earth station. The control channels C-CH$_O$ through C-CH$_m$ are used by the central earth station CES 1 where one time slot is provided for each frame. The numbers of the control channels and the request channels depend on the volume of calls. The signals which are to be transmitted by satellite channels (voice, control and request channels) are shown in a base-band in FIG. 2, at the place surrounded by one-dot-chain line. The speech signals and the out-of-band signals are transmitted by the voice channels while the control signals are transmitted via the control channels and the request channels.

Referring now to FIGS. 1 through 5, a description will be given of the operation of a voice communication exchange, in the case where a subscriber station 31a (FIG. 1) served by the SSE station 3a via the line 30a is calling and a subscriber station 41 served by the MSE station 4 through the line 40a is called.

Figure 5:
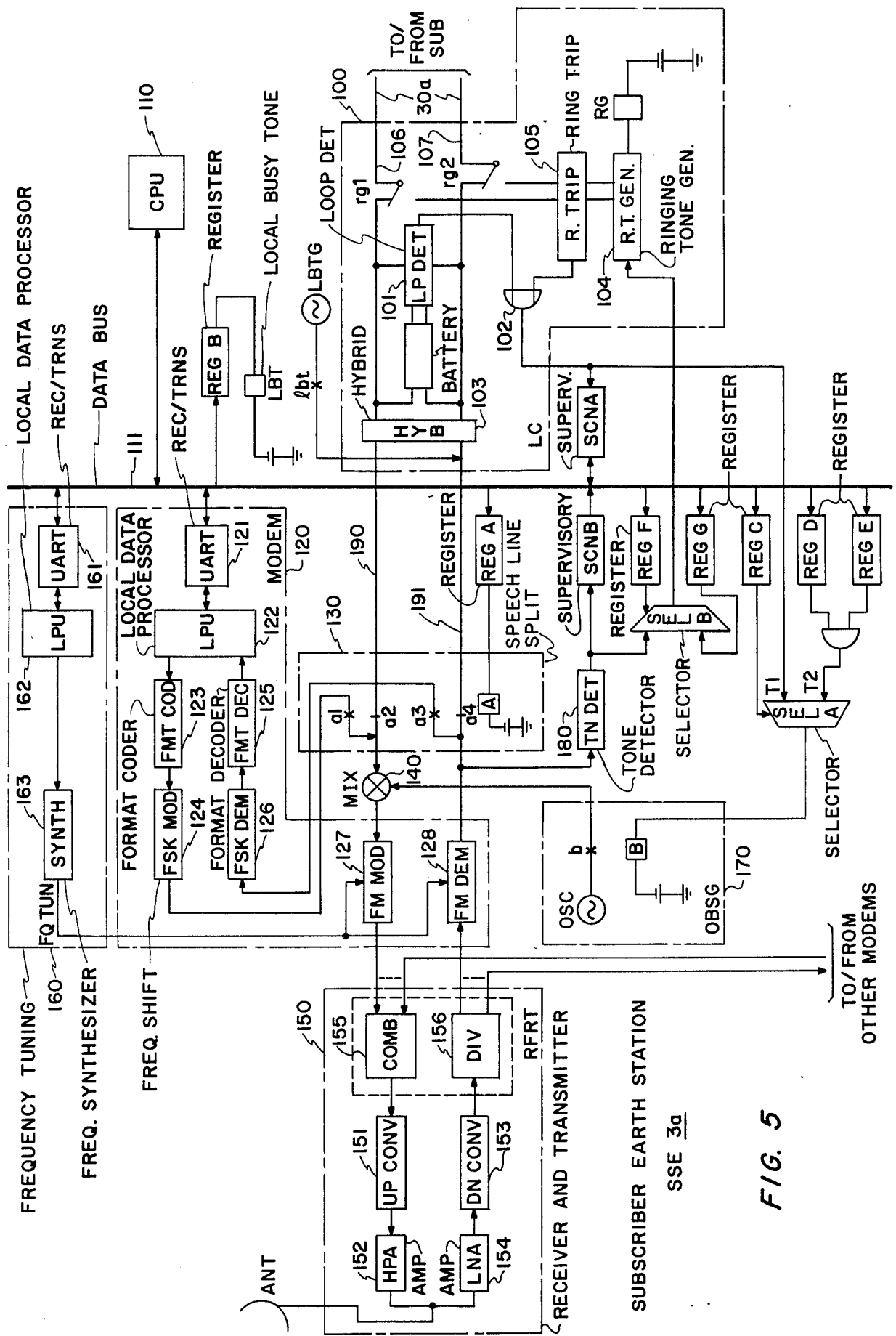
FIG. 5 is a detailed view of the subscriber earth station shown in FIG. 1.

When the subscriber station 31a goes off hook to issue a call, a closed loop is formed between two speech lines 106 and 107 of a line circuit (LC) 100 shown in FIG. 5. A loop detector (LPDET) 101 connected to the lines 106 and 107 detects the closed loop to give a calling-detection signal of logical "1" in a supervisory circuit (SCNA) via an OR gate 102. The SCNA is driven at a given cycle by a central processor unit (CPU) 110, via a data bus 111, to transmit the calling-detection signal to the CPU 110. The CPU 110 recognizes the call from the subscriber station 31a, and consecutively transmits a plurality of byte data including a calling-indication data and its own earth station number. This data is transmitted in an asynchronous manner to a local processor unit (LPU) 122, via a universal asynchronous receiver and transmitter (UART) 121 of a modulation and demodulation (MODEM) circuit 120.

Based on these parallel data, the LPU 122 prepares data in serial form for a request (REQ) signal (FIG. 3) transmission and outputs the serial data to a format coder (FMT COD) 123. The FMT COD 123 adds the preamble, unique word and BCH code to the serial data, and converts it into a data format which is transmittable by a satellite channel. The REQ signal is a digital bit stream produced from the FMT COD 123 and is modulated into an analog signal at a frequency shift keying modulator (FSK MOD) 124.

The REQ signal is input to a frequency modulation modulator (FM MOD) 127 via a made-contact a$_1$ of a relay A of a speech line split (SPLIT) circuit 130, which is driven via a register (REGA) and a mixer (MIX) 140 after the CPU 110 has identified the calling subscriber station 31a. Then request signal REQ is frequency-modulated into a signal of 70 MHz-IF (intermediate frequency)-band.

The REQ signal in the IF-band is frequency-converted into a signal of 14 GHz-band by an up-converter (UP CONV) 151 of a radio frequency reception and transmission (RFRT) circuit 150, power-amplified by a high-power amplifier (HPA) 152, and then transmitted via an up-link toward the satellite 7. The REQ signal is relayed to the CES station 1 (FIG. 4), for instance, via the request channel R-CH$_O$ (refer to FIG. 2) of the satellite 7. The REQ signal is a 12 GHz-band signal in a down-link from the satellite 7 toward the central earth CES station 1.

The REQ signal is received via an antenna (ANT) (FIG. 4) of the CES station 1 and is power-amplified by a low noise amplifier (LNA) 201 of a radio frequency reception and transmission (FRFT) circuit 200, frequency-converted into an IF-band signal by a down-converter (DN CONV) 202. Then, divider (DIV) 203 demultiplexes control signals and speech signals from other subscriber earth stations. Frequency modulation demodulator (FM DEM) 211 demodulates the REQ signal given from RFRT circuit 200 from the IF-band signal into a base-band signal.

A control and request channel signal modulation and demodulation (C-CH, R-CH MODEM) circuit 210 then converts the demodulated signal into a logical signal at a frequency shift keying demodulator (FSK DEM) 212. Further, the preamble, unique word, BCH code and other added data are removed from the REQ signal by a format decoder (FMT DEC) 213, to make a serial data including the calling-indication data and data of the calling earth station number which specifies the particular calling subscriber station. Then, the data is transmitted to a local processor unit (LPU) 217.

The LPU 217 converts the serial data into a plurality of parallel data and transmits the parallel data in the units of a byte size to a universal asynchronous receiver and transmitter (UART) 218. A central processor unit (CPU) 250 periodically reads the REQ signal data from the UART 218 via a data bus 251. The CPU 250 analyzes the read data and acknowledges the read data as a call request from the SSE station 31. Subsequently, the CPU 250 enables a common signalling unit (CSU) 260 to inform the central switching system CSS 2 (FIG. 1), via a common control line 11, that there is a call request from the SSE station 31.

When an acknowledgement (ACK) signal (FIG. 3) is sent back from the CSS system 2 (FIG. 1) via the control line 11, the CPU 250 (FIG. 4) outputs the ACK signal data to the LPU 217 via the UART 218. The ACK signal data includes a call verification-indication data, data of a calling earth station number, and assigned voice channel data or usable transmission and reception frequency data. The LPU 217 outputs these data to a format coder (FMT COD) 216. The FMT COD 216 adds the preamble, unique word and BCH code to the above described data and transforms that data into a data format which is suitable for transmission over a satellite channel.

The ACK signal is sent from the FMT COD 216 as digital bit stream data and is frequency-modulated from a base-band signal into an IF-band signal, at a frequency shift keying modulation (FSK MOD) 215 and a frequency modulation modulator (FM MOD) 214 and then it is input to the RFRT cirucit 200. The ACK signal is multiplexed with the speech signal and the control signal of the voice channel by a combiner (COMB) 204, frequency-converted into a 14 GHz-band signal by an up-converter (UP CONV) 205, power-amplified by a high power amplifier (HPA) 206 and then transmitted from the antenna to the satellite 7. For instance, the ACK signal is relayed at the satellite 7 (FIG. 1) via the control channel C-CH$_O$ (refer to FIG. 2), converted into a signal of 12 GHz-band down-link frequency and then transmitted to the SSE station 3a.

The ACK signal is sent to the RFRT circuit 150 (FIG. 5) of the SSE station 3a and is power-amplified at a low-noise amplifier (LNA) 154, converted into an IF-band signal by a down converter (DN CONV) 153, and then transmitted to a frequency modulation demodulator (FM DEM) 128. The ACK signal which has been converted into a base-band signal at the FM DEM 128 is passed through a make-contract a3 of the line split relay A, and demodulated into digital data by a frequency shift keying demodulator (FSK DEM) 126. The preamble, unique word and BCH code data of the ACK signal is removed at a format decoder (FMT DEC) 125 and is transferred from the LPU 122 to the UART 121.

The CPU 110 periodically drives the UART 121 to read out the ACK signal and acknowledges that the call request from the SSE station 3a has been verified at the central earth station CES 1. Then, the CPU 110 feeds the REGA a release signal for causing the line split relay A to open the make-contacts a1 and a3. The CPU 110 also outputs the transmission and reception frequency data contained in the ACK signal from the CES station 1 to the LPU 122 via the UART 121. With such data, the LPU 122 controls a synthesizer (SYNTH) 163 of a frequency tuning (FQTUN) circuit 160 to tune the FM MOD 127 and the FM DEM 128 to the transmission frequency f1 and the reception frequency f2.

At the CES station (FIG. 4), the CPU 250 selects a first voice channel modulation and demodulation (V-CH MODEM$_O$) circuit 220 which is idle and tunes an FM MOD 224 and an FM DEM 221 to the transmission frequency f2 and the reception frequency f1 respectively. The frequency tuning is carried out by controlling a synthesizer (SYNTH) 243 with an LPU 242 which receives transmission and reception frequency data from the CPU 250 via a UART 241 of a frequency tuning (FQTUN) circuit 240.

Figure 3:
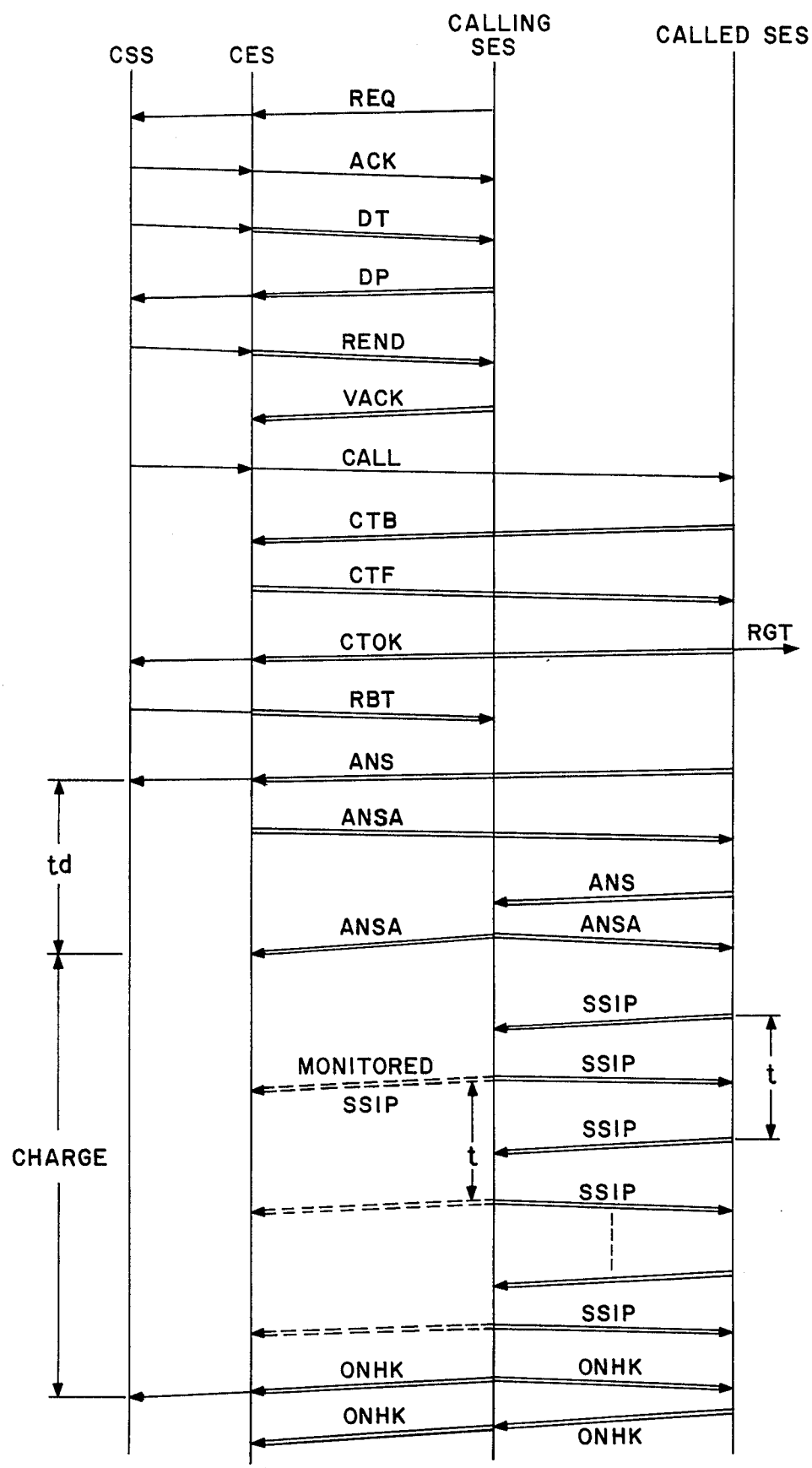
FIG. 3 shows a signal sequence for the embodiment of FIG. 1.
Figure 4:
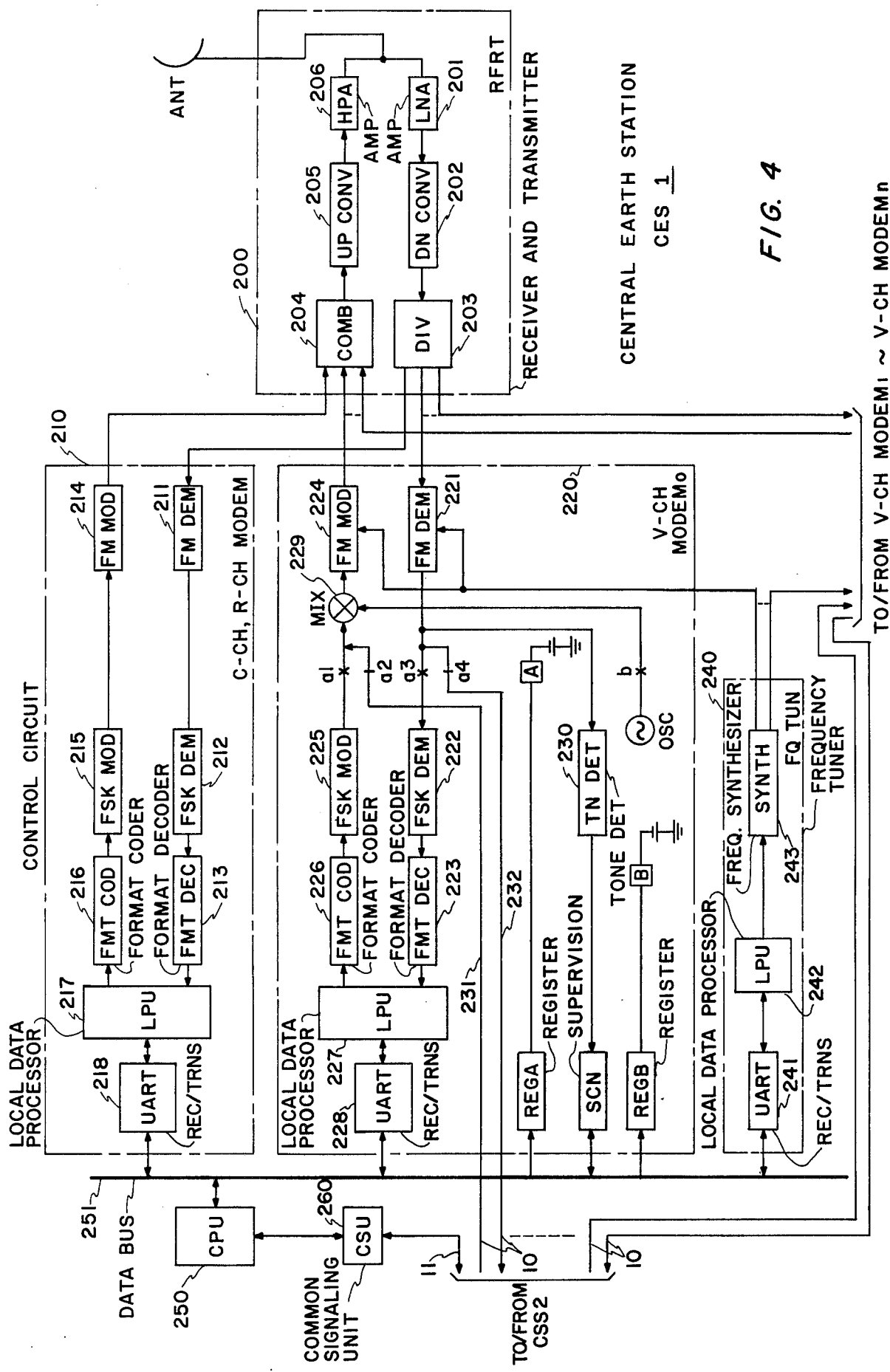
FIG. 4 is a detailed view of the central earth station shown in FIG. 1.

In response to the completion of the frequency tuning at the central earth station CES 1, a dial tone DT (FIG. 3) is transmitted from the central switching system CSS 2 (FIG. 1) via the transmission line 10 to the CES station 1 (FIG. 4). The DT passes through a speech line 231 of the V-CH MODEM$_O$ circuit 220, a break-contact a2 of a speech line split relay A and a mixer (MIX) 229, is input into the FM MOD 224, modulated into an IF-band signal, and given to the RFRT circuit 200. The DT is frequency-modulated to a 14 GHz-band signal in a manner similar to the above described modulation at the RFRT circuit 200 and is transmitted to the satellite 7 (FIG. 1). The dial tone DT is relayed to the satellite 7 by the voice channel V-CH$_{10}$ (FIG. 2), converted into a 12 GHz-band signal and then transmitted to the SSE station 3a (FIG. 1).

The dial tone DT received by the RFRT circuit 150 (FIG. 5) of the SSE station 3a (FIG. 1) is converted into an IF-band signal, and given to the FM DEM 128. The dial tone DT is demodulated into a base-band signal by the FM DEM 128 and is sent to a hybrid circuit (HYB) 103 via a speech line 191, which is inserted with a break-contact a4 of the line split relay A, and is transferred to the subscriber station 31a (FIG. 1) via the transmission line 30a connected to the speech line 191.

Upon receiving the dial tone DT, the subscriber at station 31a transmits a called subscriber number in a dial pulse format. The dial pulse DP is received at the LP DET 101 of the subscriber earth station 3a, via the transmission line 30a. These pulses are consecutively supplied to an input terminal T1 of a selector (SELA) after passing through the OR gate 102. The selector SELA is a switch-controlled via a register (REGC) when the CPU 110 detects a call. Each digit of the dial pulse train DP is consecutively input to the SELA and there is regenerated by turning on/off the out-of-band (OSC) to generate a signal of 3825 Hz in an oscillation output of an out-of-band signal generator (BSG) 170 at a make-contact b of a relay B. The regenerated signals are given to the FM MOD 127 as a base-band signal, via the mixer 140. The dial pulses DP are frequency-modulated into an IF-band signal at the modulator FM MOD 127, converted into a 14 GHz-band signal at the RFRT circuit 150, and transmitted to the satellite 7. Each digit of the dial pulse train DP is consecutively relayed to the central earth station CES 1 by the voice channel V-CH$_O$ (FIG. 2).

The dial pulses DP are consecutively fed to the RFRT circuit 200 (FIG. 4) of the station 1 and are there converted into an IF-band signal, demodulated into a base-band signal at the FM DEM 221 of the V-CH MODEM$_O$ circuit 220, and fed into a tone detector (TN DET) 230. The dial pulse DP produced from the TN DET 230 is a DC signal which is read by the CPU 250 via a supervisory circuit (SCN). The CPU 250, having read all the dial pulse digits of the DP, analyzes them to identify the called subscriber and the station which serves the subscriber. The CPU 250 transmits the dial pulses DP to the CSU 260, and transfers the dial pulses DP to the central switching system CSS 2 (FIG. 1) via the control line 11. In response to the reception of the first digit of the dial pulses DP by the system 2, it stops transmission of the dial tone DT. As soon as system 2 has received the last digit, it sends out a receive end (REND) signal (FIG. 3) to the station 1 via the control line 11.

It is assumed that the called subscriber station which has been identified by the CPU 250 of the CES station 1 is the subscriber station 41a which is served by the MSE station 4 via the transmission line 40a shown in FIG. 1. The SSE station 3a is notified since the particular call identified at the CPU 250 is the one for a subscriber earth station-to-subscriber earth station. In other words, when the CPU 250 (FIG. 5) receives the REND signal (FIG. 3) from the CSS system 2, it enables and operates the line split relay A via the REGA of the V-CH MODEM$_O$ circuit 220. Accordingly, make-contacts a1 and a3 are closed to switch the FM MOD 224 and the FM DEM 221 to an FSK MOD 225 and an FSK DEM 222, respectively.

Then, the CPU 250 sends out byte data including subscriber earth station-to-subscriber earth station communication-indication data, via a UART 228. An LPU 227 converts such data into the REND signal as serial data and transmits the serial data to an FMT COD 226. The FMT COD 226 adds the preamble, unique word, and BCH code to the serial data and format-converts it. The REND signal is modulated into an analog signal by the FSK MOD 225, modulated into an IF signal by the FM MOD 224, and then is transmitted to the RFRT circuit 200. It is further converted into a 14 GHz-band signal at the RFRT circuit 200 and transmitted to the satellite 7 (FIG. 1). The REND signal is transmitted to the SSE station 3a via the voice channel V-CH$_{10}$.

The REND signal from the station 1 is converted into an IF-band signal at the RFRT circuit 150 of the SSE station 3a, and demodulated into a base-band signal at the FM DEM 128. The REND signal input at the FMT DEC 125 via the make-contact a3 of the line split relay A and the FSK DEM 126, is format-converted into serial data including subscriber earth station-to-subscriber earth station communication-indication data, and is read out from the FMT DEC 125 by the LPU 122.

When the CPU 110 receives the REND signal from the LPU 122 via the UART 121, it sets a subscriber earth station-to-subscriber earth station call-indication register (REGE) in order to transmit a speech status-indication pulse SSIP (FIG. 3) which will be described hereinafter. At the same time, CPU 110 switch-controls the selector SELA via the REGC. The CPU 110 enables the MODEM circuit 120 and the RFRT circuit 150 in the same manner as above to output a voice channel-acknowledgement (VACK) signal (FIG. 3) to the CES station 1. The VACK signal is transmitted by the voice channel V-CH$_O$.

The VACK signal is converted into an IF-band signal by the RFRT circuit 200 of the station 1, and demodulated into a base-band signal by the FM DEM 221 of the V-CH MODEM$_O$ circuit 220. Further, it is converted into serial data after being input at the FSK DEM 222 and an FMT DEC 223 via the make-contact a3 of the line split relay A. The VACK signal is in a serial data format which has been read from the FMT DEC 223 by the LPU 227 and is read by the CPU 250 from the LPU 227, via the UART 228.

Upon receiving the VACK signal, the CPU 250 outputs a signal to the REGA in order to release-control the line split relay A. Accordingly, the FM MOD 224 and the FM DEM 221 are connected to speech lines 231 and 232 via break-contacts a2 and a4, respectively.

On the other hand, the central switching system CSS 2 requests the CES station 1 via the control line 11 for a called party start signal (CALL) see FIG. 3, at a predetermined time after having produced the REND signal. The CPU 250 produces the CALL signal forming data and sends it to the LPU 217 of the C-CH, R-CH MODEM circuit 216. The CALL signal data contains the data which indicates that the call identified at the CES station 1 is the one for a subscriber earth station-to-subscriber earth station, the caller subscriber earth station number, the data of temporarily assigned transmission and reception frequency, etc. The FMT COD 216 modulates these data from the LPU 217 into an IF-band signal as the CALL signal. The FSK MOD 215 and the FM MOD 214, convert the CALL signal into a 14 GHz-band signal by the RFRT circuit 200. The converted signal is transmitted to the MSE station 4 by the control channel C-CH$_O$ of the satellite 7.

The MSE station 4 is constructed basically in a manner similar to the SSE stations 3a through 3n, as shown in FIG. 5. However, MSS station A has a combiner (COMB) 155 and a divider (DIV) 156 in order to accommodate a plurality of subscriber stations 41a through 41m (FIG. 1). The RFRT circuit 150 is shared by the subscriber stations, 41a through 41m, but other circuits are provided correspondingly to the subscribers.

Therefore, the CALL signal is input from the CES station 1 to the RFRT circuit 150 as well as to the CPU 110 of a station which coincides with the subscriber earth station number included in the CALL signal. This input is via the MODEM circuit 120. The CPU 110 controls the FQTUN circuit 160 to tune the FM DEM 128 and the FM MOD 127 into the transmission and reception frequencies, which are temporarily assigned to this call. CPU 110 also sets the REGE for the speech status indication pulse SSIP transmission and reception.

Then, the MSE station 4 transmits a continuity test backward (CTB) signal (FIG. 3) to the temporarily assigned voice channel V-CH$_1$ for a continuity test of the satellite channel connected to the CES station 1. When the CPU 250 of the CES station 1 receives, in a normal manner, the CTB signal from the MSE station 4 after the CALL signal has been transmitted, via a V-CH MODEM$_1$ circuit (not shown), it sends back on the voice channel V-CH$_{11}$ a continuity test forward (CTF) signal (FIG. 3) which contains the same frequency assignment data as the frequencies f1 and f2 of the voice channels V-CH$_O$ and V-CH$_{10}$ which are assigned to the SSE station 3a.

The CPU 110 of the MSE station 4 which has received the CTF signal controls the FQTUN circuit 160 with the transmission reception frequency data included in the CTF signal to tune the FM MOD 127 and the FM DEM 128. The CPU 110 also transmits a ringing tone sent-out indication signal to a register (REGG) and transmits a switch indication signal, for a selector (SELB), to a register (REGF). By this manipulation, the selector SELB drives a ringing tone generator (RETG) 104 to enable a relay RG, thereby applying ringing tone to the speech lines 106 and 107 which are connected to the subscriber station 41a via contacts rg1 and rg2 to a ring trip circuits (RGTRIP) 105 and the RGTG 104. Accordingly, a ringing tone (RGT) is transmitted to the subscriber 41a.

Upon receiving the CTF signal, the CPU 110 of the MSE station 4 transmits a continuity test OK (CTOK) signal (FIG. 3) via the voice channel V-CH$_1$ to the station 1.

The CTOK signal from the MSE station 4 is frequency-converted into an IF-band signal by the RFRT circuit 200 (FIG. 4) of the station 1, modulated into a base-band signal at the V-CH MODEM$_1$ circuit, converted into a digital signal, and then read out from the V-CH MODEM$_1$ circuit by the CPU 250. The CPU 250 transmits the CTOK signal to the CSS 2 (FIG. 1) via the CSU 260 and the common control line 11. Upon receiving the CTOK signal, the CSS 2 sends out a ring back tone (RBT) to the CES station 1. The RBT is input to the FM MOD 224 of the V-CH MODEM$_O$ circuit 220 via the speech line 231 to be modulated into an IF-band signal, converted into a 14 GHz-band signal by the RFRT circuit 200 and transmitted to the SSE station 3a (FIG. 5) by the voice channel V-CH$_{10}$.

The modulated RBT of 12 GHz-band which has been input at the RFRT circuit 150 of the SSE station 3a via the satellite 7 is converted into an IF-band signal, and demodulated into a base-band signal at the FM DEM 128 of the MODEM circuit 120. The RBT in base-band is transmitted to the calling subscriber station 31a (FIG. 1) via the SPLIT circuit 130 and the line circuit LC 100. The calling subscriber station 31a can therefore learn that the called subscriber station 41a is being called with the ringing tone RGT.

If the called subscriber station 41a responds to the RGT, an off-hook signal is detected by the LPDET 101 of the LC 100. The LPDET 101 informs the supervisory circuit SCNA via the OR gate 102 of the response of the subscriber station 41a. The CPU 110 which drives the SCNA with a predetermined cycle acknowledges it. Since the off-hook detection signal from the LPDET 101 has been given to the SELA when the SELA is driven by the CPU 110 via the REGC, the relay B of the OBSG 170 is intermittently driven.

An answer (ANS) signal formed by switching on and off the out-of-band signal at the contact b is inputted at the FM MOD 127, and converted into an IF-band signal. The ANS signal (FIG. 3) is input at the RFRT circuit 150 and is converted into a 14 GHz-band signal and transmitted to the CES station 1 via the voice channel V-CH$_1$.

The ANS signal is given at the RFRT circuit 200 of the CES station 1 via the satellite 7 from the MSE station 4 and is converted into an IF-band signal, demodulated into a base-band signal at an FM DEM (not shown) of the V-CH MODEM$_1$ circuit, and sent to a tone detector (TN DET). The CPU 250 drives a supervisory circuit SCN, reads the logical signal of TN DET output and acknowledges the response of the called subscriber station 41a. The ANS signal produced from the FM DEM is transmitted to the CSS 2 (FIG. 1) through a speech line. The CSS 2 receives the ANS signal, and then stops the transmission of the RBT. The CPU 250 which acknowledges the answer from the called subscriber station 41a sends back an answer-acknowledgement (ANSA) signal (FIG. 3) to the SSE station 3a. The ANSA signal is generated when the CPU 250 enables the relay B of the V-CH MODEM$_1$ circuit via a register (REBG) and turns on/off the 3825 Hz out-of-band signal of an oscillator output at a contact b. The ANSA signal is modulated into an IF-band signal at the FM MOD via a mixer 229 is converted into 14 GHz-band signal at the RFRT circuit and sent back to the MSE station 4 via the voice channel V-CH$_{11}$.

The ANSA signal received at the RFRT circuit 150 (FIG. 5) of the MSE station 4 comes from the CES station 1 via the satellite 7, is converted into an IF-band signal, and is given at the MODEM circuit 120. It is then demodulated into a base-band signal at the FM DEM 127 of the MODEM circuit 120 and input to the TN DET 180. The CPU 110 reads the detection output of the TN DET 180 via a supervisory circuit (SCNB) which the CPU 110 periodically drives. The CPU 110 acknowledges that the ANSA signal has been transmitted back from the station 1, by sending out the data of the same frequencies f1 and f2 as those assigned to the SSE station 3a or the normal assigned frequency data to a LPU 162 via a UART 161 of the FQTUN circuit 160. This signal control the SYNTH 163 to tune the FM MOD 127 and the FM DEM 128 to the transmission frequency f2 and the reception frequency f1, respectively.

The CPU 110 of the MSE station 4 intermittently operates the relay B of the OBSG 170 via the registers REGC, REGD, REGE and selector SELA to turn on/off a 3825 Hz out-of-band signal output from the oscillator (OSC) for generating an ANS signal. The ANS signal is input to the FM MOD 127 of the MODEM circuit 120 via the mixer 140 to be modulated into an IF-band signal, converted into a 14 GHz-band signal at the RFRT circuit 150, and transmitted to the calling SSE station 3a by using the voice channel V-CH$_{10}$. The CPU 110 release-controls the line split relay A via the register REGA and connects the FM MOD 127 and the FM DEM 128 to the speech lines 190 and 191 via the contacts a2 and a4.

The ANS signal is input into the RFRT circuit 150 of the SSE station 3a via the satellite 7 from the MSE station 4. The ANS signal is demodulated into a base-band signal at the FM DEM 128, and input to the tone detector TN DET 180. The detection output of the TN DET 180 is read from the supervisory circuit SCNB by the CPU 110. Then, the CPU 110 outputs a change-over signal to he REGC to switch-control the SELA toward the side of an input terminal T2.

Since this particular call is a subscriber earth station-to-subscriber earth station call, the register REGE is set to output a logical signal "1" to one of the input terminals of an AND gate. The REGD is set by the CPU 110 when an out-of-band signal is generated from the OBSG 170. Therefore, if the REGD connected to the other input terminal of the AND gate is periodically set, the relay B can be intermittently operated via the selector SELA. The contract b can turn on and off the 3825 Hz out-of-band signal of the OSC output to generate an ANSA signal. The ANSA signal from the RFRT circuit 150 of the SSE station 3a is received by the CES station 1 (FIG. 1) and the MSE station 4 via the voice channel V-CH$_O$ of the frequency f1. The CPU 110 also release-controls the relay A via the REGA and connects the FM MOD 127 and the FM DEM 128 to the speech lines 190 and 191 via the contacts a2 and a4.

Accordingly, the voice communication between the subscriber station 31a served by the SSE station 3a and the subscriber station 41a served by the MSE station 4 becomes possible without having to be relayed by the CES station 1. The voice communication is directly relayed by the satellite 7 through one satellite link. The toll call charging for this voice communication will start with a given timing to signal from the time when the ANS signal from the MSE station 4 is received by the CSS central switching system 2 (refer to FIG. 3). While the voice communication continues, the calling-SSE station 3a and the called-MSE station 4 exchange transmission/reception of the speech status-indication pulse SSIP at a given cycle t.

The SSIP pulse is generated by turning on and off at a given cyclic rate the relay B of the OBSG 170 of the respective stations 3a and 4. Relay B connects/disconnects the 3825 Hz out-of-band signal of the oscillator output through the contact b. The CPU 110 operation-controls the REGD to periodically enable the relay B. However, the SSIP pulse does not generate unless the REGE is set and the subscriber maintains the off-hook status or in other words, the call is being continued. The SSIP pulse generated at the OBSG 170 is passed through the mixer 140, modulated into an IF-band signal at the FM MOD 127 together with an in-band speech signal, converted into 14 GHz-band signal at the RFRT circuit 150 and transmitted to the subscriber earth station of the other party. The SSIP pulse transmitted from the subscriber earth station of the other party is demodulated into a base-band signal by the FM DEM 128 of the MODEM circuit and the RFRT circuit 150 and is detected by the TN DET 180. The detection output signal of the TN DET 180 is read from the supervisory circuit SCNB by the CPUT 110. The SSIP pulse is transmitted from the calling SSE station 3a to the called MSE station 4 while the communication is monitored by the TN DET 230 of the V-CH MODEM$_O$ circuit 220 of the CES station 1.

In case this voice communication ends normally, when the subscriber station 31a of the calling SSE station 3a is released, an on-hook signal is read by the CPU 110 via the LPDET 101, OR gate 102 and selector SCNA. By these manipulations, the CPU 110 continuously enables the relay B of the OBSG 170 via the selector SELA to transmit a continuous signal to 3825 Hz as an on-hook (ONHK) signal (FIG. 3) to the central earth CES station 1 and the called MSE station 4.

At the CES station 1, the CPU 250 (FIG. 4) detects the ONHK signal from the detection output of the TN DET 230 of the V-CH MODEM$_O$ circuit 200. The ONHK signal is sent out to the central switching CSS (FIG. 1) system 2 via the CSU 260 (FIG. 4) and the common control line 11. When receiving the ONHK signal, the central switching CSS system 2 stops charging. The ONHK signal is sent out to the CES station 1 and the calling SSE station 3a when the subscriber station 41a of the called MSE station 4 is released, too. Subsequently, these stations 1, 3a and 4 are released responsive to the operation procedure of this particular call.

If some failure occurs on the satellite channel to make the communication impossible during the voice communication between the SSE station 3a and the MSE station 4, it is necessary to suspend the toll charging at the central switching CSS system 2 in order to prevent overcharging. In this embodiment, the SSIP from the calling SSE station 3a which is received by the called MSE station 4 at a predetermined cycle is monitored by the CES station 1. When this SSIP signal is not be received twice in a row, the CPU 250 of the station 1 transmits a forced release signal to the central switching CSS system 2 via the common control line 11 to immediately suspend charging. Similarly, when the calling SSE station 3a and the called MSE station 4 does not receive the SSIP from the opposite party engaged in the communication consecutively twice, the CPU 110 actuates a relay LBT via the register REGB to transmit a local busy tone from a local busy tone generator (LBTG) through the contact 1bt to the subscriber stations 31a and 41a.

While this invention has thus far been described in conjunction with the preferred embodiment, many alternatives and modifications thereto can be easily conceived by those skilled in the art. For example, the 3825 Hz out-of-band signal may be another frequency signal between 3400 Hz and 4000 Hz. Voice communication may be performed between subscriber stations served by one multi-subscriber earth station.

Those who are skilled in the art will readily perceive how to modify the system. Therefore, the appended claims are to be construed to cover all equivalent structures which fall within the true scope and spirit of the invention.

We claim:

1. A domestic satellite communication system including a central earth station and a plurality of subscriber earth stations, means at said central earth station responsive to a demand for controlling a frequency assignment of voice communication satellite channels in response to an occurrence of a call which identifies a subscriber earth station-to-subscriber earth station call, a central switching system for carrying out voice switching operations, and each of said plurality of subscriber earth stations serving at least one voice communication terminal, each of said subscriber earth stations comprising:
indication means for indicating that a call identified at said central earth station is for a subscriber earth station-to-subscriber earth station; means for monitoring the continuity of a communication channel at said voice communication terminal; and means for periodically transmitting an out-of-band signal in a voice communication satellite channel which is assigned by said central earth station while said monitoring means detects the continuity of a communication channel and said indication means indicates the subscriber earth station-to-subscriber earth station call, said central earth station comprising:
means for demodulating said out-of-band signal transmitted from said subscriber earth station; means for receiving said out-of-band signal which has been demodulated by said demodulating means; means for monitoring the continuity of a communication channel between said subscriber earth stations by periodically reading out the output of said receiving means; and means for tuning the frequency of said demodulating means to coincide with a frequency assigned to said voice communication between said subscriber earth stations, whereby said subscriber earth station-to-subscriber earth station call is connected through one satellite link.

2. A satellite communication system comprising a central earth station and a plurality of outlying earth stations mutually intercommunicating via a plurality of radio link channels extending between a satellite and said earth stations, means at said central earth station responsive to an occurrence of a call for controlling the assignment of channel frequencies to said call, means at each of the outlying stations for recognizing a call signal indicating that it is involved in the call for causing a recognized station to tune itself to a frequency assigned by the central earth station, means for periodically monitoring the continuity of an assigned channel by a use of an out-of-band signal frequency transmitted from the outlying earth station involved in said call, and means for terminating a call if said periodic monitoring indicates no out-of-band signal frequency during two successive monitoring periods.

3. The system of claim 2 and means for initiating a toll charge in response to an answer signal generated responsive to an answer of said call by a called party, means effective throughout said call for periodically generating a speech status indication pulse of said out-of-band frequency to carry out said monitoring, and means responsive to a failure to detect said speech status indication pulse during said two successive monitoring periods for terminating said toll charge.

4. The system of claim 2 wherein each of said channel frequencies includes a speech signal band of frequencies having a general band width of approximately 3000 Hz, and a narrow band of control frequencies superimposed within said 3000 Hz of said speech signal band of frequencies, said out-of-band signal frequency being a narrow band of frequencies which are higher than said speech band and no higher than 4000 Hz.

5. The system of claim 2 wherein said outlying earth stations comprise at least three classes of stations for serving single subscriber stations, a plurality of subscriber stations, or a private branch exchange.

6. The system of claim 5 wherein said central earth station is coupled into lines of a land based telephone system, whereby said central earth station functions as an interface between said land based telephone system and said satellite communication system, central data processor means at said central earth station for matching idle ones of said radio-link channels and said lines to said land based telephone system to make said channel frequency assignments, and local data processor means in said outlying earth station for tuning said outlying station to an assigned channel frequency.

7. The system of claim 6 and means responsive to said tuning to said assigned channel frequency for sending dial tone from said central earth station over said assigned channel frequency.

8. The system of claim 7 and means at said outlying earth station responsive to dial pulses for switching off and on an out-of-band oscillator to regenerate said dial pulses for transmission over said assigned channel frequency.

9. The system of claim 8 and means in the central earth station responsive to said regenerated dial pulses for controlling said land based telephone system to complete a connection to a called line.

10. The system of claim 8 and means in the central earth station responsive to said regenerated dial pulses for assigning another channel frequency to extend said call to one of said outlying earth stations which serves a called line.

11. The system of claim 10 and means at said outlying earth stations for serving a plurality of subscriber stations for combining and dividing a plurality of said channel frequencies for transmission of said satellite.

* * * * *